US008606391B2

(12) United States Patent
Beck et al.

(10) Patent No.: US 8,606,391 B2
(45) Date of Patent: Dec. 10, 2013

(54) VIRTUAL MACHINE TOOL FOR REPRESENTING ACTIONS OF MACHINING UNITS AND GENERATING OPERATING DATA FROM USER INPUT

(75) Inventors: Eberhard Beck, Aichwald (DE); Stefan Grossmann, Lichtenwald (DE); Joerg Junginger, Altbach (DE); Matthias Eisele, Stuttgart (DE)

(73) Assignee: Index-Werke GmbH & Co. KG Hahn & Tessky, Esslingen (DE)

( * ) Notice: Subject to any disclaimer, the term of this patent is extended or adjusted under 35 U.S.C. 154(b) by 0 days.

(21) Appl. No.: 13/302,430

(22) Filed: Nov. 22, 2011

(65) Prior Publication Data

US 2012/0265330 A1    Oct. 18, 2012

Related U.S. Application Data

(63) Continuation of application No. PCT/EP2010/056919, filed on May 19, 2010.

(30) Foreign Application Priority Data

May 26, 2009   (DE) .......................... 10 2009 023 648

(51) Int. Cl.
*G06F 19/00*     (2011.01)
*G05B 11/01*    (2006.01)
*G05B 15/00*    (2006.01)

(52) U.S. Cl.
USPC ............... 700/160; 700/17; 700/83; 700/159; 700/169; 700/180

(58) Field of Classification Search
USPC ........... 700/17–20, 83, 86–87, 159–160, 169, 700/175, 180–182, 246–247, 264; 718/1
See application file for complete search history.

(56) References Cited

U.S. PATENT DOCUMENTS

| | | | | |
|---|---|---|---|---|
| 6,290,571 | B1 * | 9/2001 | Dilger et al. ...................... | 451/5 |
| 6,356,800 | B1 * | 3/2002 | Monz et al. .................. | 700/184 |
| 6,612,004 | B2 * | 9/2003 | Yamazaki et al. ............. | 29/27 C |
| 7,024,272 | B2 * | 4/2006 | Thomas et al. ............... | 700/182 |
| 7,209,800 | B2 * | 4/2007 | Monz et al. .................. | 700/184 |
| 7,239,938 | B2 * | 7/2007 | Otsuki et al. ................ | 700/178 |
| 7,280,948 | B2 * | 10/2007 | Duggirala ........................ | 703/7 |
| 7,421,363 | B2 * | 9/2008 | Thomas et al. ............... | 702/113 |
| 7,526,359 | B2 * | 4/2009 | Landers et al. .............. | 700/182 |
| 7,684,890 | B2 * | 3/2010 | Grossmann et al. .......... | 700/169 |

(Continued)

FOREIGN PATENT DOCUMENTS

| | | |
|---|---|---|
| DE | 103 47 169 A1 | 5/2005 |
| DE | 10 2006 043 390 A1 | 3/2008 |

(Continued)

*Primary Examiner* — Ramesh Patel
(74) *Attorney, Agent, or Firm* — Reinhart Boerner Van Deuren P.C.

(57) ABSTRACT

It is proposed that an interaction unit which allows a manual interaction is associated with a visualization unit, that a function selection unit which allows an association of a function of a machine tool with this manual interaction is associated with the visualization unit, and that a function data generator unit is provided that generates operating data which correspond to the manual interaction, while taking the associated function into account, and transmits these operating data to a visualization controller in order to represent, on the visualization unit, using visualization elements, the function specified by the manual interaction.

42 Claims, 9 Drawing Sheets

(56) References Cited

U.S. PATENT DOCUMENTS

| | | | |
|---|---|---|---|
| 7,684,891 B2 * | 3/2010 | Okrongli et al. | 700/179 |
| 2002/0049960 A1 * | 4/2002 | Monz et al. | 717/109 |
| 2007/0061037 A1 * | 3/2007 | Grossmann et al. | 700/182 |
| 2008/0058984 A1 * | 3/2008 | Gray et al. | 700/192 |
| 2008/0091394 A1 * | 4/2008 | Hahn et al. | 703/7 |
| 2009/0326892 A1 * | 12/2009 | Lin | 703/7 |
| 2010/0063616 A1 * | 3/2010 | Mori et al. | 700/160 |
| 2010/0274380 A1 * | 10/2010 | Gray | 700/104 |
| 2010/0292822 A1 * | 11/2010 | Hahn | 700/98 |

FOREIGN PATENT DOCUMENTS

| | | |
|---|---|---|
| DE | 10 2007 045 593 A1 | 3/2009 |
| EP | 0 902 343 A2 | 3/1999 |
| EP | 1 762 919 A2 | 3/2007 |

\* cited by examiner

VIRTUAL MACHINE TOOL FOR REPRESENTING ACTIONS OF MACHINING UNITS AND GENERATING OPERATING DATA FROM USER INPUT

This application is a continuation of international application number PCT/EP2010/056919 filed on May 19, 2010.

This patent application claims the benefit of International application No. PCT/EP2010/056919 of May 19, 2010 and German application No. 10 2009 023 648.1 of May 26, 2009, the teachings and disclosure of which are hereby incorporated in their entirety by reference thereto.

BACKGROUND OF THE INVENTION

The invention relates to a control system for a machine tool having a work space and machining units arranged therein, the control system comprising a visualization controller which, based on operating data and based on a stored machine model, represents the machine tool, at least in the region of the work space thereof, on a visualization unit, by means of visualization elements, as a virtual machine tool having virtual machining units provided in a virtual work space, and represents the functions of the virtual machining units as virtual functions.

Such control systems are known from the prior art. These control systems operate as conventional programmable control systems, for example CNC control systems, and by means of the visualization controller and the visualization unit also allow functions of the machine tool which are specifiable by the operating data to be represented as virtual functions, and thus to determine and/or test, for example, the functionality of a subprogram for controlling the machine tool, the subprogram being generated in a conventional manner by generation of data records.

It is an object of the invention, therefore, to configure a control system of the generic type so that it is easier to operate.

SUMMARY OF THE INVENTION

This object is achieved according to the invention by a control system of the aforementioned type, in that an interaction unit which allows a manual interaction is associated with the visualization unit, that a function selection unit which allows an association of at least one function of the machine tool with this manual interaction is associated with the visualization unit, and that a function data generator unit is provided that generates operating data which correspond to the manual interaction, while taking the associated function into account, and transmits these operating data to the visualization controller in order to represent, on the visualization unit, using the visualization elements, the function specified by the manual interaction.

The advantage of the solution according to the invention is that it provides the option, based on a manual interaction in conjunction with an association of this manual interaction with a function of the machine tool, to generate virtual functions of the machine tool, and to represent the virtual functions on the visualization unit, using the visualization elements.

Thus, unlike the approaches known heretofore, there is an option to generate operating data by manual interaction, and to represent the effects of the manual interaction on the visualization unit by means of the visualization elements, taking the associated function into account.

As a result, it is possible not only to easily generate operating data, but also to represent same with regard to these generated functions as virtual functions on the virtual machine tool, and thus, to generate them in an optimal manner with regard to their suitability and precision, directly during the manual interaction.

Alternatively or additionally, another solution to the problem according to the invention provides that an interaction unit which allows a manual interaction is associated with the visualization unit, that a function selection unit which allows an association of a function of the machine tool with this manual interaction is associated with the visualization unit, and that a function data generator unit is provided that generates operating data which correspond to the manual interaction, while taking the associated function into account, and stores these operating data in a recording/playback unit.

The advantage of this approach is that it allows operating data for controlling the machine tool to be easily generated, namely, by the manual interaction, taking into account the relationships represented by the virtual machine tool.

In principle, the manual interaction could be represented in a time-delayed manner on the visualization unit.

For example, it would be conceivable to store the operating data, and then, based on the stored operating data, to represent the manual interaction on the visualization unit in a time-delayed manner.

It is particularly advantageous for performing the manual interaction when the manual interaction is representable at the same time, preferably synchronously, by the visualization elements, since a user thus has the option of directly recognizing the effects of the manual interaction on the virtual machine tool, in particular on virtual machining units of the virtual machine tool, and thus, determining whether or not the function specified by the manual interaction leads to a meaningful result.

To allow the manual effect to be directly checked, it is preferably provided that the manual effect on the interaction unit is representable by an interaction visualization element which is controllable by the interaction unit and is provided on the visualization unit.

The advantage of this approach is that not only is it possible to check the manual effect by performing the function on the virtual machine tool, but at the same time to perform a first check of the manual effect due to the fact that the interaction visualization element is likewise represented on the visualization unit, and therefore an operator is able to recognize that the function has been performed, based on the interaction visualization element, and also is able to check the manner in which the function is performed on the virtual machine tool and on the visualization elements themselves.

By use of the manual interaction unit, the functions may be specified in various ways and then visualized.

One approach provides that the function is specifiable as motion, using the interaction unit, and is visualizable on the virtual machine tool, by means of the visualization controller, as motion of at least one of the visualization elements.

This means in particular that the manual interaction is carried out as motion, and this motion is then represented by one of the visualization elements; this is meaningful in particular when the visualization element representing the motion represents a virtual machining unit, so that the manual interaction unit provides the option of moving virtual machining units of the virtual machine tool, and thus manually specifying, for example, motions upon approaching a workpiece for machining, and/or also motions during machining of the workpiece, by moving the interaction unit.

Another advantageous approach provides that, by use of the interaction unit, the function is specifiable by touching an execution field, which represents a visualization element, on the visualization unit, and is visualizable, in its execution on the virtual machine tool, by means of the visualization controller.

This approach is provided in particular when the function is not easily representable on the visualization unit by use of the visualization elements, for example, is an indexing function whose effect is not easily representable. In this case, the representation of an execution field as a visualization element for specifying the function is a suitable measure.

The function of the machine tool could be associated with the particular manual interaction in very different ways.

For example, it would be conceivable to provide the function selection unit with a dedicated input unit, for example a keyboard, by means of which the manual interaction may be associated with the function.

However, one particularly advantageous approach provides that the function to be associated with the manual interaction in each case is selectable using the interaction unit.

That is, the action unit may be used not only for manually specifying an execution of the function, but also for associating a function of the machine tool with this manual interaction, for example before or after the manual interaction to be carried out.

Such a selection of the function using the interaction unit may be made in various ways.

For example, it is conceivable to provide the interaction unit with separate displays for selecting the function.

However, one particularly easily used approach provides that the function is selected by calling up at least one of the visualization elements.

Calling up at least one of the visualization elements in this manner could likewise be performed in various ways, for example by passing around a visualization element.

However, one particularly advantageous approach provides that at least one of the visualization elements is called up, using the interaction unit, by approaching and touching at least one of the visualization elements.

The selection of a function may be displayed by the visualization unit in various ways.

One option is that when the function is selected, the visualization element representing the function is highlighted on the visualization unit.

Highlighting such a visualization element may be achieved, for example, by a change in brightness or a change in color of the visualization element.

Alternatively or additionally, to this end it is also conceivable that calling up the particular function only results in a representation of the visualization elements for this function.

For example, it is conceivable that, as the result of calling up a function regarding a motion of a visualization element, the visualization element representing the function on the visualization unit is shown in addition to the existing visualization element, and is hidden when this function is deselected.

In principle, for the control system according to the invention, it is conceivable for functions to be allowed without restriction. However, this has the disadvantage that problems occur when the position data and/or control data for controlling the actual machine tool, which are generated for the function data generator unit, are in turn transferred, since the actual machine tool might in some cases not be able to carry out the functions.

For this reason, it is preferably provided that the possible functions of the actual machine tool are stored in the machine model, and that the function selection unit limits the functions to be associated to the possible functions of the actual machine tool.

To provide further optimal support to the operator, it is preferably provided that the possible functions of the actual machine tool are representable on the visualization unit by means of visualization elements. When manually specifying the functions, the operator may thus be visually guided by the representation of the visualization elements which correspond to the possible functions in such a way that only the possible functions can be manually specified, and this is also immediately recognizable by the operator.

With regard to the type of functions, heretofore no further information has been provided in the explanation of the approach according to the invention.

It is thus provided, for example, that at least one of the functions of the machine tool includes a motion of a machining unit relative to at least one other machining unit.

In addition, for example at least one of the functions of the machine tool may relate to activation of a machining unit.

For example, at least one other of the functions of the machine tool may relate to an indexing motion of a machining unit.

With regard to the type of visualization elements, heretofore no further information has been provided.

Thus, it is preferably provided that at least one of the visualization elements is a graphical visualization element.

A graphical visualization element is understood to mean a graphical element which is either an image of a machining unit or is a graphical symbol which symbolizes a machining unit, a function of a machining unit, or a position of the machining unit.

Alternatively or additionally, to this end it is provided that at least one of the visualization elements is a function field.

A function field is understood to mean a field in which function information is represented in written or numerical form.

With regard to the visualization elements, likewise no specific information has been provided heretofore in the explanation of the approach according to the invention.

It is thus provided, for example, that at least one of the visualization elements represents a virtual machining unit.

In this case, in particular the visualization element is a graphical visualization element by means of which the machining unit may be represented, either schematically or as a more or less precise image.

For example, it is also provided that at least one of the visualization elements represents a tool.

In this case as well, the visualization element is preferably a graphical visualization element which either schematically represents an outer contour of the tool, or preferably, precisely represents at least one cutting contour.

However, since for a tool it is important not only to represent the outer contour or cutting contour of the tool, but also to enter tool correction data for a tool, if necessary, in addition to a graphical visualization element a display field preferably is also optionally provided, by means of which tool correction data may be entered.

Furthermore, it is also provided, for example, that at least one of the visualization elements represents a workpiece.

In this case as well, the visualization element is preferably a graphical visualization element which either schematically or preferably with the greatest precision represents the outer contour of the workpiece, in order to be able to depict, on the visualization unit, with the greatest possible precision, the dimensional proportions necessary for machining the workpiece.

Various approaches are conceivable regarding the design of the interaction unit.

Thus, one advantageous approach provides that the interaction unit includes a hand-held control unit, in particular a computer mouse, for determining the manual interaction.

Alternatively or additionally, to this end it is provided that the interaction unit includes a touch-controllable visualization unit, for example a so-called touchscreen, for determining the manual interaction.

In order to not only use the operating data for the visual representation with regard to the virtual machine tool, but also to optionally be able to store and reuse the operating data, a data stream generator is preferably provided which combines the operating data to form a storable data stream, in particular a time-synchronous data stream.

A time-synchronous data stream is understood to mean that the data stream has not only the correct time sequence of the data, but also the exact time-position synchronization of the data, for example during path travel, by combination of motions in the direction of at least two axes of motion.

The storable data stream is preferably formed as a data stream in which the operating data follow one another in the time sequence of their processing.

To allow storage of the data stream, the record/playback unit is preferably provided, in which the data stream is storable as a data file.

By use of such a record/playback unit, once a data stream has been generated it may advantageously be stored so that the functions contained in this data stream may be again checked and/or corrected, and/or supplemented at a later time.

In addition, the record/playback unit is suitable for reproducing the data stream in such a way that it is possible to play back the function using the visualization controller and the visualization unit, and/or to control the actual machine tool using this data stream.

With regard to the type of data generated by the function data generator unit, heretofore no further information has been provided.

Thus, in principle it would be conceivable to provide any type of data structure for these data.

One advantageous approach provides that the function data generator unit generates position data and/or control data.

With regard to their structure, such position data and/or control data preferably correspond to position data and/or control data which are generated by conventional machine tool control systems, preferably programmable machine tool control systems, in particular CNC control systems.

The position data are preferably free of tool correction data, i.e., are tool-neutral, so that, depending on the dimensions of the tool that is used, corrections may be made using the position data together with corresponding tool correction data.

It is also preferably provided that the control system includes a tool correction module which corrects the position data using tool correction data, and generates location information.

With regard to the operating principle of the tool correction module, heretofore no further information has been provided.

One advantageous approach provides that tool-specific tool correction data which may be called up via tool correction addresses are stored in the tool correction module.

In order to associate the proper tool correction in the tool correction module with the correct tool, it is preferably provided that tool correction addresses for finding the tool correction data corresponding to the particular tool are transmittable to the tool correction module.

In particular, it is provided that the tool correction addresses are generatable in the function data generator unit, in particular a tool correction generator.

In addition, the control system is preferably designed in such a way that it includes a position controller which generates control information based on location information.

Such control information may be used in conventional control systems for directly controlling the various axis drives, for example linear axes or rotational axes.

In principle, in the approach according to the invention it is possible to transfer position data to the visualization controller, so that the visualization controller generates the function sequences based on the position data.

However, in order for the time response of the actual machine tool to be applied for the virtual machine tool to the greatest extent possible, it is preferably provided that the visualization controller receives the control information, and, on the basis of same, generates the representation of the virtual machine tool, using function sequences which correspond to the control information.

To make use of the control data, an adjustment control system is preferably provided which generates actuator signals based on control data.

Such actuator signals may then preferably be used for controlling actuators, i.e., drives, for example, in particular actuating drives.

In this case it is provided in particular that, on the basis of the actuator signals, the visualization controller generates the representation of the virtual machine tool, using the functions which correspond to the actuator signals.

With regard to the generation of the operating data, heretofore no further information has been provided.

Thus, one advantageous approach provides that the function data generator unit determines the location data of the interaction unit, using a location data generator, and based on these location data generates the position data.

It is particularly advantageous when the location data generator subtracts tool correction data from the location data obtained from the interaction unit in order to ensure that the resulting position data may be universally used with different tools, since in each case the tool correction data may then be added to these position data, depending on the tool that is used.

In addition, it is preferably provided that the function data generator unit has a tool correction data generator which detects tool correction data from the interaction unit.

It is conceivable, for example, to enter tool correction data in a tool correction mode via the interaction unit, for example a keyboard for the interaction unit, the tool correction data then being processed for the tool correction data generator.

The tool correction data generator operates in such a manner that it generates tool correction addresses under which the tool correction data may be stored and later retrieved.

Another advantageous approach provides that the function data generator unit has a control generator which detects control instructions from the interaction unit.

It is advantageously provided that the control data generator generates the control data based on the control instructions.

The invention further relates to a method for controlling a machine tool having a work space and machining units arranged therein, in which, based on operating data and based on a stored machine model, the actual machine tool, at least in the region of the work space thereof, is represented on a visualization unit by means of visualization elements as a virtual machine tool having virtual machining units provided in a virtual work space, and the functions of the virtual machining units are represented as virtual functions, wherein the object stated above is achieved according to the invention in that a manual interaction is provided, that an association of a function of the machine tool with this manual interaction is provided, and that a function data generator unit is used to generate operating data which correspond to the manual interaction, while taking the associated function into account, and these operating data are transmitted to the visualization controller in order to represent, on the visualization unit, using the visualization elements, the function specified by the manual interaction.

Alternatively or additionally, to this end it is provided in a method according to the invention that a manual interaction is provided, that an association of a function of the machine tool with this manual interaction is provided, and that a function data generator unit is used to generate operating data which correspond to the manual interaction, while taking the associated function into account, and these operating data are stored in a recording/playback unit.

Further features and advantages are the subject matter of the following description and the illustration of several exemplary embodiments in the drawings.

DETAILED DESCRIPTION OF THE INVENTION

Figure 1:
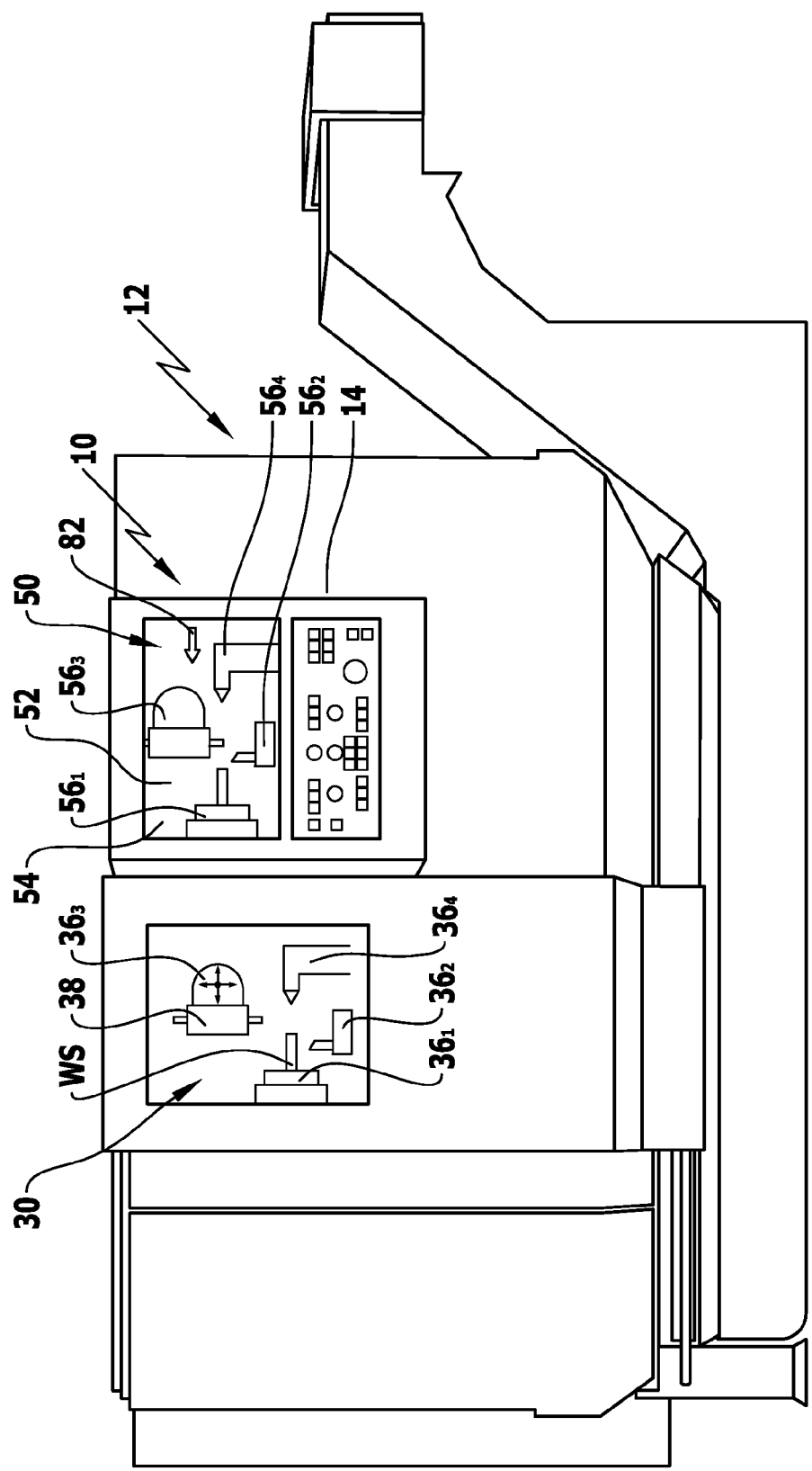
FIG. 1 shows a front view of a first exemplary embodiment of a machine tool according to the invention.
Figure 2:
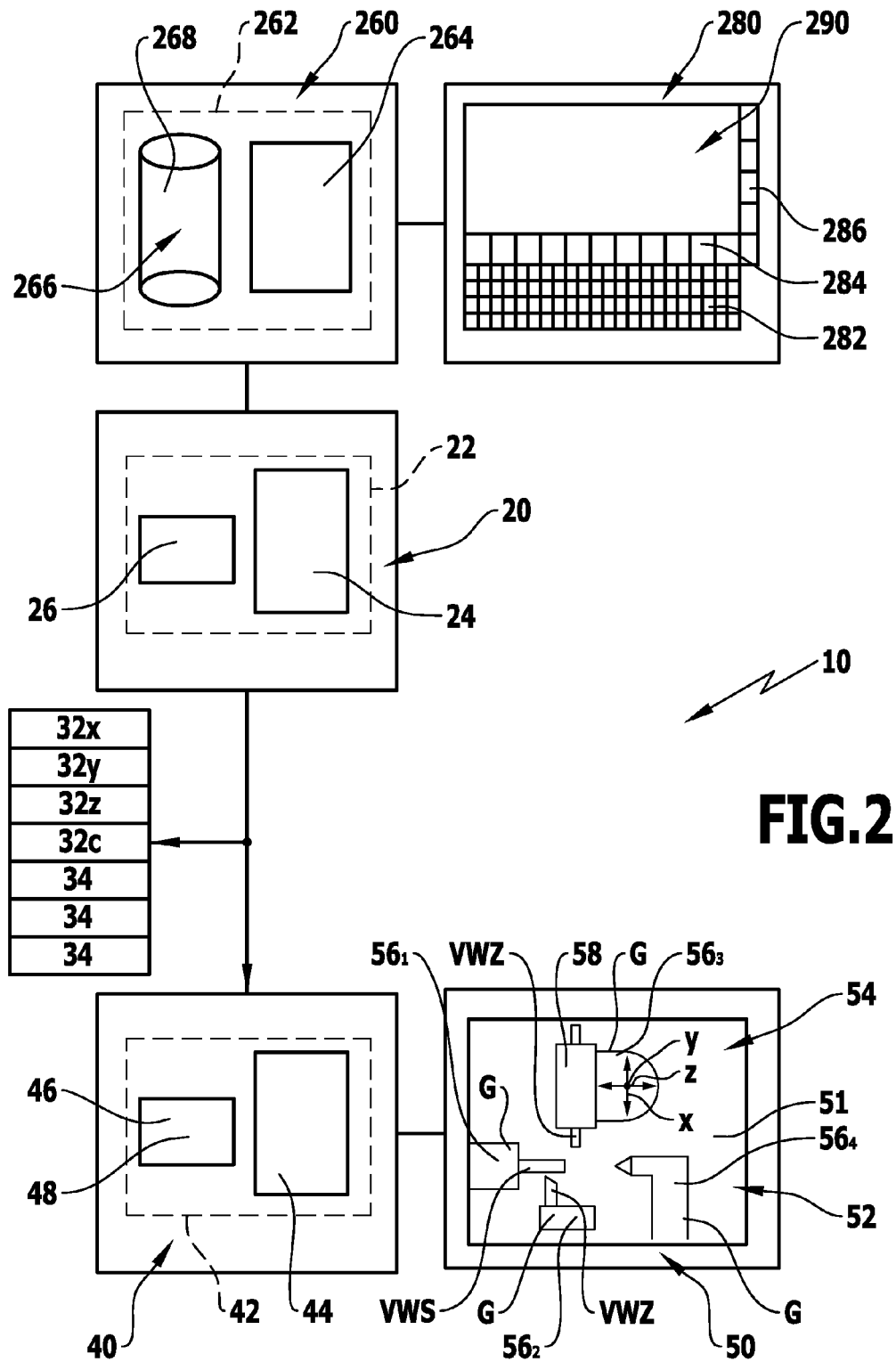
FIG. 2 shows a schematic illustration of a control system according to the invention and the components thereof.

A first exemplary embodiment of a control system 10 according to the invention for an actual machine tool 12, illustrated in FIG. 1, is mounted, for example, on a machine housing 14 of the machine tool 12, and, as illustrated in FIG. 2, as part of a conventional machine tool control system which operates using control data records and includes an action controller 20 having a data processing unit 22, which includes a processor 24 and a memory 26.

The actual machine tool 12 is provided with actual machining units $36_1$, $36_2$, $36_3$, $36_4$ which are arranged in an actual work space 30 and which are movable relative to one another via actual axis drives 32 in order to machine a workpiece WS in the work space 30.

The axis drives 32, for example axis drives $32_x$, $32_y$, $32_z$, and $32_c$ of the actual machine tool 12, are controllable in a conventional manner by means of the action controller 20, specified by the control data records, and are provided, for example, for performing the actual axial motions of actual machining units $36_1$, $36_2$, $36_3$, $36_4$ in an actual work space 30 of the actual machine tool 12 in the direction of the X axis, Y axis, Z axis and C axis.

For example, the axis drives $32_x$, $32_y$, and $32_z$ are associated with machining unit $36_3$, which is formed as a tool carrier, in order to move the machining unit in the direction of the X axis, the Y axis, and the Z axis relative to the machining unit $36_1$ which carries the workpiece WS, and machining unit $36_1$, which is formed as a workpiece spindle, is associated with axis drive $32_c$ and allows a rotary drive of the workpiece spindle as well as rotary positioning of the workpiece spindle. Similar associations are also provided for machining unit 36, for example, using further axis drives.

Furthermore, additional actuators 34 are controllable by means of the action controller 20, the actuators being used, for example, to bring about indexing motions of tool carriers, for example a tool turret 38 of the machining unit $36_3$, or swivel-in motions of other machining units, for example a machining unit $36_4$ formed as a tailstock.

In addition, the action controller 20 may also be used to control a visualization controller, denoted overall by reference numeral 40, which includes a data processing unit 42 having a processor 44 and a memory 46 in which a machine model 48 is stored, the machine model taking into account the geometric configurations of local circumstances present in the work space 30 of the machine tool 12, as well as the geometric and functional configurations of machining units 36 provided in the work space of the machine tool 12 and of possible tools and workpieces, so that the machine model 48 has at its disposal all information for imaging the actual circumstances regarding geometric configuration as well as functional configuration.

The visualization controller 40 may be used to control a visualization unit, denoted overall by reference numeral 50, on the screen 51 of which a virtual machine tool 52, which corresponds to the actual machine tool 12 with regard to geometric and functional configuration, is representable, for example in its subregion which relates to a virtual work space 54, and in particular using graphical elements G which, for example, represent virtual machining units $56_1$, $56_2$, $56_3$, $56_4$ arranged in the virtual work space 54 of the virtual machine tool 52, wherein, for example, virtual machining unit $56_1$ corresponds to actual machining unit $36_1$ and, for example, represents a workpiece spindle in which a workpiece WS may be accommodated.

In addition, a first tool carrier which corresponds to the actual machining unit $36_2$ is provided as a virtual machining unit $56_2$, for example, and is movable in the X, Y, and Z directions relative to the workpiece WS.

A second tool carrier which corresponds to the actual machining unit $36_3$ is provided as a further machining unit $56_3$, for example, and includes a tool turret 58 on which a multiplicity of tools WZ may be arranged and brought into an operating position by means of an indexing motion of the virtual tool turret 58.

Lastly, a so-called tailstock which corresponds to the actual machining unit is provided as the fourth virtual machining unit $56_4$, and is used to support the workpiece WS as necessary.

The visualization controller 40 is used to represent all virtual machining units 56, which correspond to the actual machining units 36, of the virtual machine tool 52 on the screen 51 as graphical elements, specifically, with regard to their geometric features on the one hand and with regard to their functional features on the other hand, i.e., in particular the functions provided in the actual machine tool 12 for the actual machining units 36, such as for example possible motions of these units, these functions including not only the particular axial motions that are provided, but also the dynamic parameters provided in conjunction with the axial motions.

Thus, by use of the visualization controller 40, the virtual machine tool 52 together with its virtual machining units 56, tools WZ and workpieces WS is movable on the screen 51 in the same way as the actual machine tool 12, in particular with regard to the geometric relationships as well as the motion relationships, including the motion dynamics.

Figure 3:
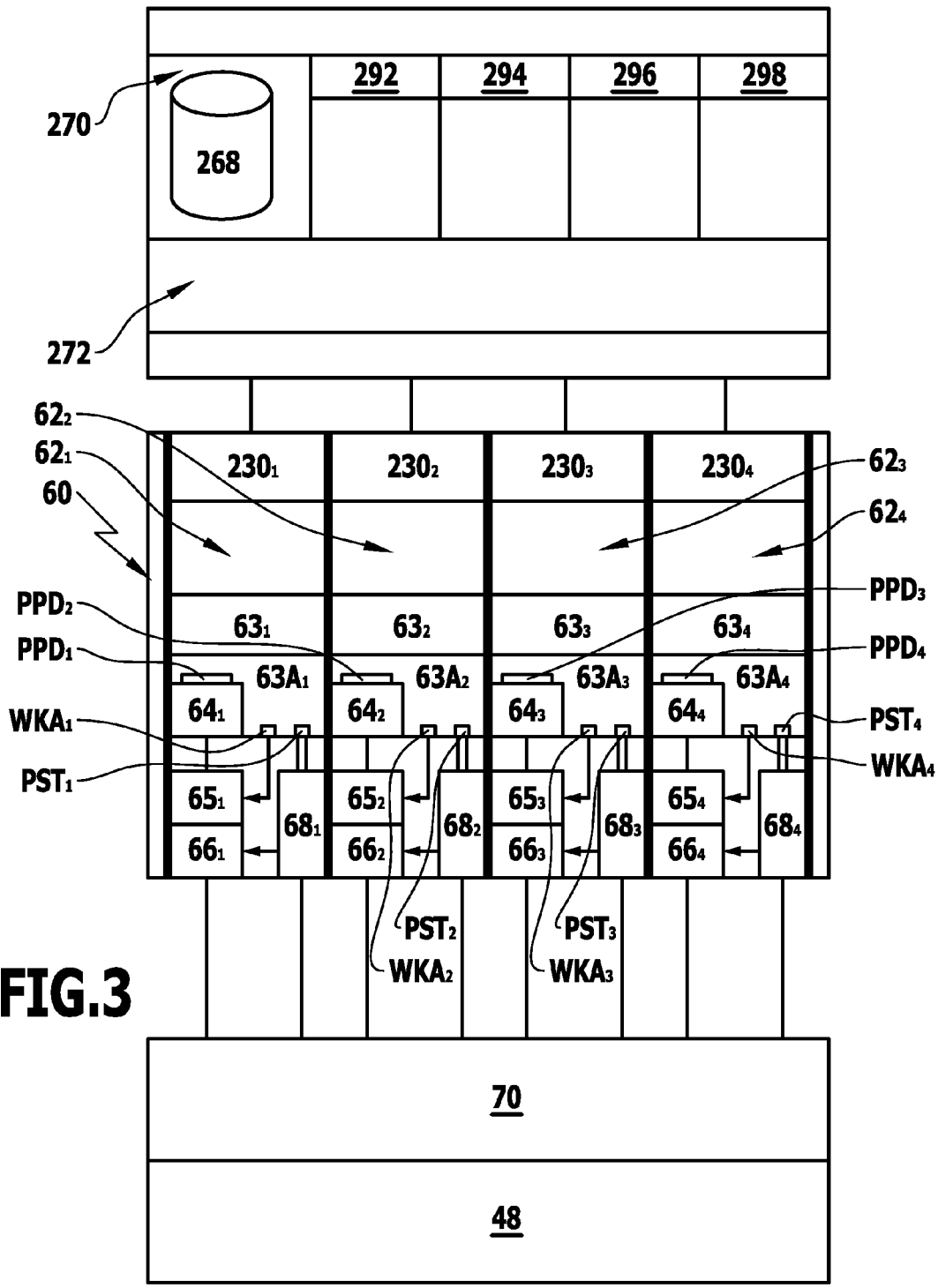
FIG. 3 shows a schematic illustration of a program structure of the control system according to the invention.

As illustrated in detail in FIG. 3, a control program 60 runs on the data processing unit 22, in which program the individual axial motions which are necessary for machining a workpiece are processed in combination in channels 62, for example the channels $62_1$, $62_2$, $62_3$, $62_4$, and in each channel 62 a record preparation system 63 which, for example, interprets the NC records of the control program 60, generates, in an output stage 63A of the record preparation system 63, program location data PPD which include data for motions in the X, Y, Z, C orientations, tool correction addresses WKA, and programmed control data PST.

The program location data PPD are supplied to an interpolator 64.

In the interpolator 64, the individual axial motions, which are combined in the particular channel 62, are coordinated, and the particular programmed position data PL for the axes X, Y, Z, C are generated for the respective axial motion.

The programmed position data PL which are generated in the particular channel 62 are then delivered to a tool correction module 65, in which they undergo a tool correction using tool correction data WKD, the tool correction data WKD being retrievable in the tool correction module 65 under a tool correction address WKA which results from the control program 60, and which is generated in the record preparation system 63 and is delivered by the output stage 63A to the tool correction module 65.

This location information L which has been corrected using the tool correction data WKD is transmitted to the position controller 66, which generates control information RI on the output side and then operates the axis drives 32 in a position-controlled manner, using this control information RI.

The control data ST for the actuators 34 generated in the output stage 63A are delivered to an adjustment control system 68 which generates, on the output side, actuator signals AS for the actuators 34, in order to operate the actuators. The adjustment control system 68 communicates with the interpolator 64, for example, and does not allow further execution of a data record, for example, in particular an NC record, until feedback from the actuators 34 is present which confirms that the actions of the actuators 34 which are specified by the control data have been carried out.

By transmitting the tool correction address WKA to the tool correction module 65, the output stage 63A ensures that the tool correction data WKD are available in the tool correction module 65 for the tool correction of the programmed position data PL before generation of the programmed position data PL in the interpolator 64.

In addition, the output stage 63A ensures that, during generation and outputting of the program control data PST, further record execution, for example, does not occur until after the action of the actuator 34 called for by the control data ST has been carried out.

This control information RI from the particular position controller 66 is optionally transmitted to the axis drives 32 of the actual machine tool 12, and/or to the visualization controller 40, which, as illustrated in FIG. 3, generates the virtual machine tool 52 together with the virtual machining units 56 on the screen 51 of the visualization unit 50, using a visualization program 70 with the assistance of the data from the machine model 48, and visualizes the execution and/or effects of the functions.

In addition, the actuator signals AS may optionally be transmitted to the actuators 34 of the actual machine tool 12 and/or of the visualization controller 40, which by use of the visualization program 70 with the assistance of the data from the machine model 48 is able to either represent actions of virtual actuators per se, or to visualize actions via graphical elements G.

The visualization program 70 according to the invention, with the assistance of the machine model 48, is able not only to represent, on the screen 51, the geometric configurations and functions, in particular motions, of the individual virtual machining units 56, but also, if necessary, to represent, in addition to depicting the machining units 56 with the assistance of graphical symbols 72, the possible individual functions as a result of the design of the actual machine tool recorded in the machine model 48, in particular the possible motions in the direction of the respective axes and their orientation, for example the X axis, Y axis, Z axis, or C axis, on the screen 51 of the visualization unit 50.

In addition, an interaction unit 80 (FIG. 4) is associated with the visualization controller 40 and the visualization unit 50, by means of which a cursor 82 may be manually moved on the screen 51, by means of a hand-held control unit 84, for example a so-called computer mouse.

In addition, it is possible to move the cursor 82 over the graphical symbols 72 which are provided for the possible motions of the virtual machining units 56, and to call up the corresponding function, for example the corresponding possible motions, by touching or clicking.

For this purpose, the interaction unit 80 cooperates with a function selection unit, denoted overall by reference numeral 90, which for its part is linked to a function data generator unit 92 that includes a location data generator 94, a tool correction generator 96, and a control data generator 98.

After calling up the particular function, the possible motions of which are displayed by the graphical symbols 72, for example the respective axes X, Y, Z, C using cursor 82, the particular virtual machining unit 56 is selected, using the cursor 82, for a motion corresponding to the selected possible motion by touching or clicking this virtual machining unit 56, and the selected function in the form of the possible motion of the machining unit 56 is thus associated with the manual interaction in the form of the motion of the cursor 82.

The location data generator 94 is able to generate the manual location data MP for the particular possible motions selected using the cursor 82, for example the axes X, Y, Z, or C, the manual location data MP corresponding to the positions of the points on the path in the direction of the particular selected possible motion or possible motions, i.e., the axes X, Y, Z, C, for example, through which a reference point B which is fixedly coupled to the cursor 82 passes during the motion of the cursor 82 on the screen 52, and which are recorded by the screen control system 80 and transmitted to the function data generation unit 92.

The reference point B may be a point on the cursor 82 itself. However, this would result in the lack of a relationship between the positions of the cursor and the associated possible motion or possible motions of the selected machining unit 56.

For this reason, it is provided that when one of the machining units 56 is touched for selecting same, a distance of the position of reference point B of the cursor 82 from a reference point BB of the selected machining unit 56, known from the machine module 48, is ascertained, and the positions of the reference point BB, ascertained based on the position of the reference point B of the cursor 82 and its distance from the reference point BB, are then used for determining the manual location data MP.

For logical reasons, these manual location data MP which are ascertained by moving the cursor 82 are already ascertained using the tool provided in the particular virtual machining unit 56, and thus, taking into account the dimensions thereof when moving the cursor 82, since this tool has additional space requirements, so that the position of a tip of this tool relative to the reference point BB of the particular virtual machining unit 56 must be taken into account for the manual motion of same.

For this reason, the interaction unit 80 is designed in such a way that it has a tool correction mode which may be called up, and, in the tool correction mode, allows, via a tool correction generator 96, the generation of a tool correction address WKA for the tool that is present, and the entry of the tool correction data WKD, for example manually, in particular via a keyboard 100, into an entry field EF for the particular tool, or allows the tool correction data WKD to be called up when they are already present in the tool correction module 65.

The tool correction data WKD may then be stored in a tool correction subtraction module 102 under the tool correction address WKA, and, if these data are not yet present, in the tool correction module 65 under the tool correction address WKA.

After subtracting the tool correction data WKD, manual position data ML are generated from the manual location data MP, using the tool correction subtraction module 102, and with regard to their information content and their potential use correspond to the programmed position data PL, and these manual position data ML are delivered by an output stage 103 to the tool correction module 65.

Thus, using the manual position data ML in the tool correction module 65, which has also been supplied with the tool correction address WKA by the output stage 103, and taking into account the tool correction data WKD stored under the tool correction address WKA, the location information L may be generated, with which the position controller 66 operates in order to generate the control information RI.

The function data generator unit 92 also includes a control data generator 98, which in conjunction with the function selection unit 90 is able to provide actions of virtual actuators on the screen 51, using visualization elements in the form of graphical elements or function fields FF, for example tabular displays 74, from which individual actions of the virtual actuators may be manually selected using the cursor 82 on the screen 51.

The control data generator 98 then determines the corresponding manual control data MST for the manually selected actions of the virtual actuators.

The manual control data MST which are provided by the output stage 103 have the same information content as the programmed control data PST, and are transmittable in the same way to the adjustment control system 68 for controlling the actions of the actuators.

Output stage 103 has the same functionalities as output stage 63A; i.e., output stage 103 requests feedback concerning the action of the actuators in the same way as output stage 63A.

Thus, the function data generator unit 92 allows generation of manual position data ML, a tool correction address WKA, and manual control data MST, which, when supplied, for example, to the tool correction module $65_1$ and the adjustment control system $68_1$ of channel $62_1$, result in the same control information RI and actuator signals AS as programmed position data PL and program control data PST generated in this channel $62_1$.

When the control information RI is generated in the channel $62_1$ and the actuator signals AS of the visualization controller 40 are transmitted, the motions of the virtual machining units 56 and actuators which are generatable by the manual position data ML, the tool correction address WKA, and the manual control data MST may be visualized on the screen 51 as motions and actions of the virtual machining units 56 and actions of the virtual actuators by the visualization elements G, FF, for example in the form of graphical elements G or function fields FF.

The same may be carried out for other channels 62 during the generation of manual position data ML, tool correction addresses WKA, and manual control data MST.

Thus, the particular virtual machining unit 56 that is selected may be manually moved on the screen 51, using the cursor 82 of the interaction unit 80, and based on the manual position data ML, the tool correction address WKA, and the manual control data MST, the virtual tool VWZ which is in the operating position performs the desired motion relative to the virtual workpiece VWS on the screen 51, using the tool correction module 65, the position controller 66, the adjustment control system 68, and the visualization controller 40. This desired motion may represent, for example, virtual machining of the virtual workpiece VWS, or only approaching the virtual workpiece VWS over a given path.

It is thus possible, using the interaction unit 80, to displace the virtual machining units 56 on the screen 51 in the desired manner, for example for the virtual machining, and to simultaneously represent the result of the displacement on the visualization unit 50, and thus to test, using the virtual machining units 56, individual motions of the virtual machining units 56 or also overall motions of the virtual machining units 56 on the screen 51 of the visualization unit 50, with the boundary conditions corresponding to the actual machine tool 12.

The manual position data ML, the tool correction addresses WKA, and the manual control data ST are already generated in a synchronized manner by the function data generator unit 92 by means of a clock signal which is provided for the entire control system, so that an exact time-position synchronization of the data is present, which is necessary, for example, for path travel, i.e., a complex motion in the direction of at least two axes of the machine tool.

To allow storage of the manual position data ML, tool correction addresses WKA, and manual control data MST which have been generated in the described manner, these are combined in a data stream generator 120 to form a synchronous data stream D in which the tool correction addresses WKA, the manual control data MST, and the manual position data ML are present, as a consecutive sequence with exact time-position synchronization, in the same sequence in which they are supplied to the tool correction module 65, the adjustment control system 68, and the position controller 66.

This data stream D is supplied by the data stream generator 120 to a record/playback unit 110 in which the data stream D is storable as data stream file DF, such a data stream file DF containing all information that is necessary for controlling the tool correction module 65, the adjustment control system 68, and the position controller 66 of one of the channels 62.

For this reason, the assignment of the particular data file DF to the particular channel 62 may be defined using the function selection unit 90.

Thus, by use of the function selection unit 90 and the function data generator unit 92, the data files DF for the individual channels 62 may be generated in succession and stored in the record/playback unit 110.

Since all channels 62 are operated at the same time during operation of the actual machine tool 12 and also during a simulation of all machining operations using the virtual machining units 56, it is also possible to use the function selection unit 90 to synchronously combine the data files DF, which are stored in the record/playback unit 110 and associated with different channels 62, and synchronously transmit them to the output stage 103, which processes the data streams D of a plurality of data files DF in parallel, and transmits them in parallel to the particular tool correction module 65 and the particular adjustment control system 68 of the respective channel 62.

Furthermore, the function selection unit 90 also allows operation of the output stage 103 in such a way that the data stream D of a previously created data file DF is processed in the output stage, and in parallel thereto the data stream D for a further channel 62, and thus also the corresponding data file DF, is manually generated by means of the function selection unit 90 and the function data generator unit 92, in order to thus coordinate the motions of the machining units with one another in a controlled manner via different channels 62.

Lastly, using the function selection unit 90 and the function control data generator unit 92, it is also possible to reproduce the data stream D of a data file DF of a channel 62 and to represent the corresponding functions on the screen 51 of the visualization unit 50, but to stop the reproduction of the data stream D in a targeted manner and make corrections of the motions or actions which result in altered manual position data ML or manual control data MST or changed tool correction addresses WKA, which are then directly changed in the data stream D.

To also be able to use the data streams D of the data files DF directly for controlling the actual machine tool 12, it is preferably provided that the particular data streams D are generated by the function data generator unit 92 in accordance with a clock signal which is provided for the control system, and which also corresponds to the clock signal of the tool correction module 65, of the position controller 66, and of the adjustment control system 68, and which in particular corresponds to the clock signal of the overall action controller 20.

In principle, an action controller 20 according to the invention does not necessarily have to process CNC programs, or in particular process CNC subprograms in the individual channels 62.

Figure 4:
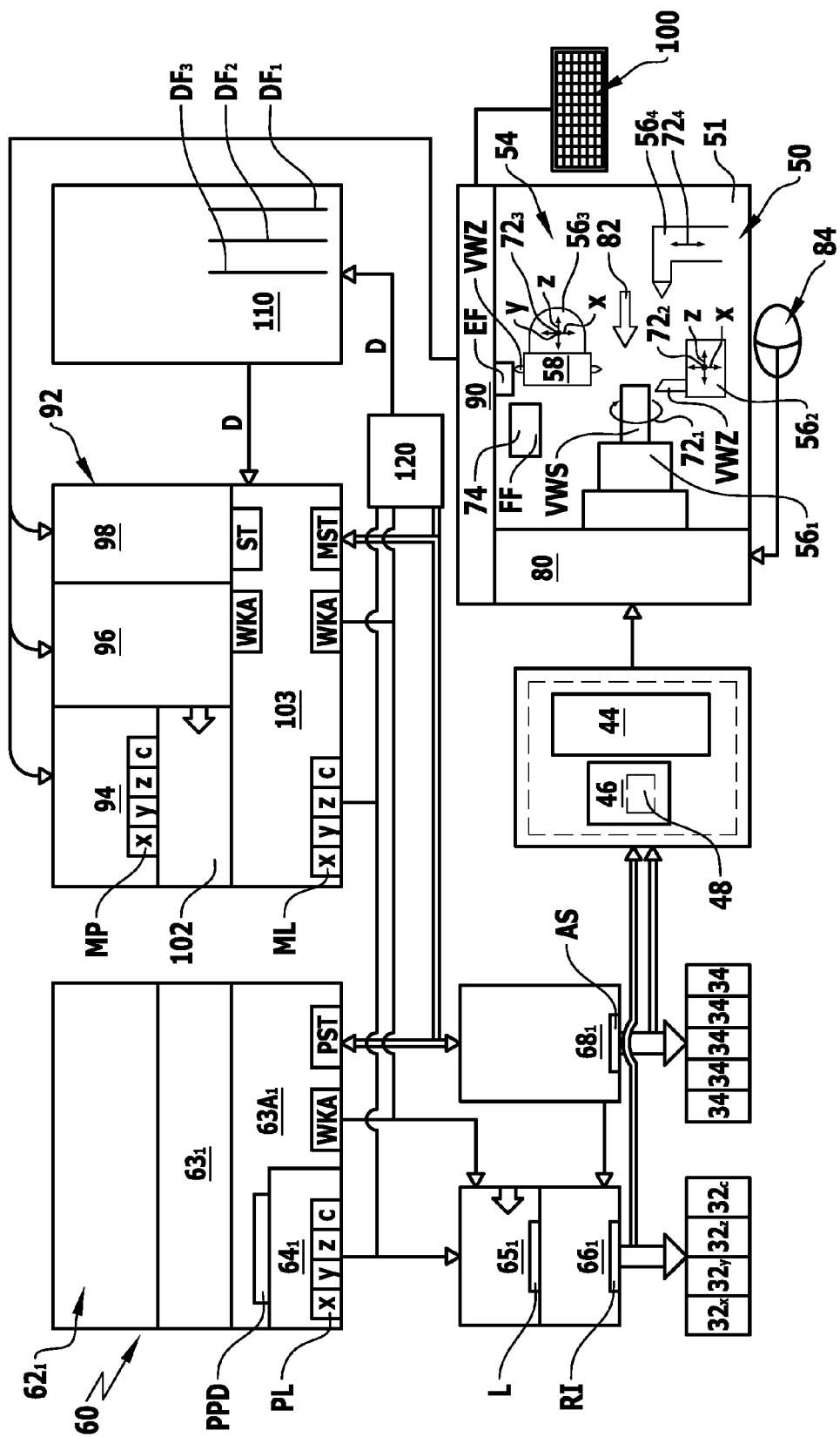
FIG. 4 shows an expanded illustration of the program structure of the control system according to the invention, showing in particular detail the options for manual interaction and the components for generating operating data based on the manual interaction.

However, as illustrated in FIGS. 3 and 4, there is the option of providing a CNC record preparation system 63, which is associated with each channel 62, with computation of program location data PPD, so that in the particular channel 62, also on the basis of CNC subprograms 230, tool-neutral programmed position data PL may be determined for the individual possible motions, and the position data are supplied to the tool correction module 65, resulting in location information L for the particular position controller 66 after the tool correction.

In addition, programmed control data PST and tool correction addresses WKA may be generated from the CNC subprograms 230 and delivered to the tool correction module 65 and the adjustment control system 68.

Using such an approach, it is thus possible to use existing CNC programs for controlling the position controller 66 and the adjustment control system 68, and thus, for controlling the possible motions of the actual machining units 36 and/or the virtual machining units 56, and to deliver the position data PL, tool correction addresses WKA, and program control data PST, which are programmed by the output stage 63A, to the data stream generator 120, so that a data stream D which is more amenable to machine control is generated by the data stream generator and is then recorded by the record/playback unit 110.

It is thus possible to generate a data stream D which is more amenable to machine control, based on conventional CNC programs; this data stream may be subsequently used as a controlling data stream D.

If, for example, the action controller 20 is also able to operate using a conventional CNC program, an operation controller 260 is preferably provided which has a third data processing unit 262 which includes a processor 264 and a memory 266, for example, one or more CNC machining program complex(es) 268 being stored in the memory 266 (FIG. 2).

In this case, an operating program which is denoted overall by reference numeral 270 and schematically illustrated in FIG. 3 runs on the third data processing unit 262, and has an operator interface 272 which cooperates with a machine control board, denoted overall by reference 280, having, for example, a conventional keyboard 282 and separate function keys 284 and 286.

Individual function sequences or modes of the operating program 270 may be called up and/or activated in a known manner, using the keyboard 282 as well as the function keys 284 and 286.

In addition, a display field 290 is preferably associated with the machine control board 280 and is used for displaying information ascertained by the operating program 270. The display field 290 may either be an independent display field, or it may be represented by a window on the screen 52.

The operating program 270 then includes, for example as illustrated in FIG. 3, program management functions, denoted overall by reference numeral 292, which are able to manage in a workpiece-related manner the CNC processing program complex 268 stored in the memory 266, as is known from the prior art, for example from DE 2005 045 028 A1.

In addition to the program management functions 292, transfer functions 294 and a backup mode 296 as well as a stop mode 298, for example, may be carried out in a known manner.

According to the invention, the data processing unit 262 may form a unit with the data processing unit 42; i.e., only one data processing unit need be present for the operation controller 270 and the visualization controller 40.

In addition, the visualization unit 50 may form a unit with the display unit and the operation controller 290, so that there is only one unit.

Likewise, the record/playback unit 110 may be a component of the data processing unit 262 or 42.

Figure 5:
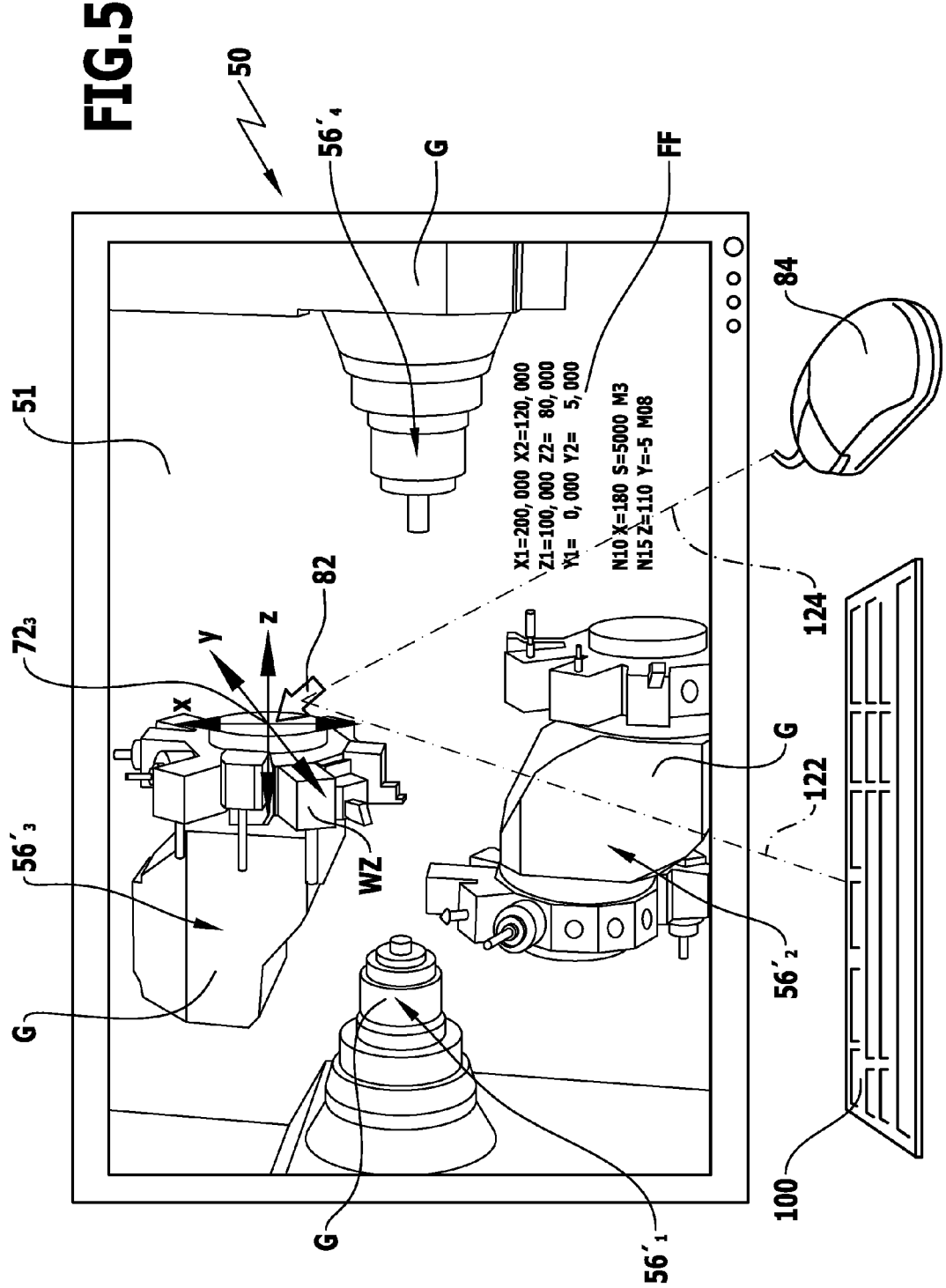
FIG. 5 shows a view of a screen of a visualization unit for a second exemplary embodiment of a control system according to the invention.

In a second exemplary embodiment of a control system according to the invention, in FIG. 5 the machining units 56' are illustrated with a different design and configuration than in the first exemplary embodiment; however, there are no changes regarding the function thereof in conjunction with the solution according to the invention.

FIG. 5 illustrates via lines of influence 122 and 124 the manner in which a manual interaction is possible, in the illustrated case the lines of influence 122 and 124 indicating that manual interactions are possible in conjunction with the machining unit 56'$_3$, which is marked by the cursor 82.

On the one hand, by using the mouse 84 it is possible to move the cursor 82, thus specifying a path for a motion of the machining unit 56'$_3$.

On the other hand, the graphical symbols 72$_3$ are used to specify the possible motions of the machining unit 56'$_3$, and in addition the line of influence 122 shows that tool correction data, for example, may be entered via the keyboard 100, in particular, the tool correction data WKD which pertain to the tool WZ that is in the operating position.

Figure 6:
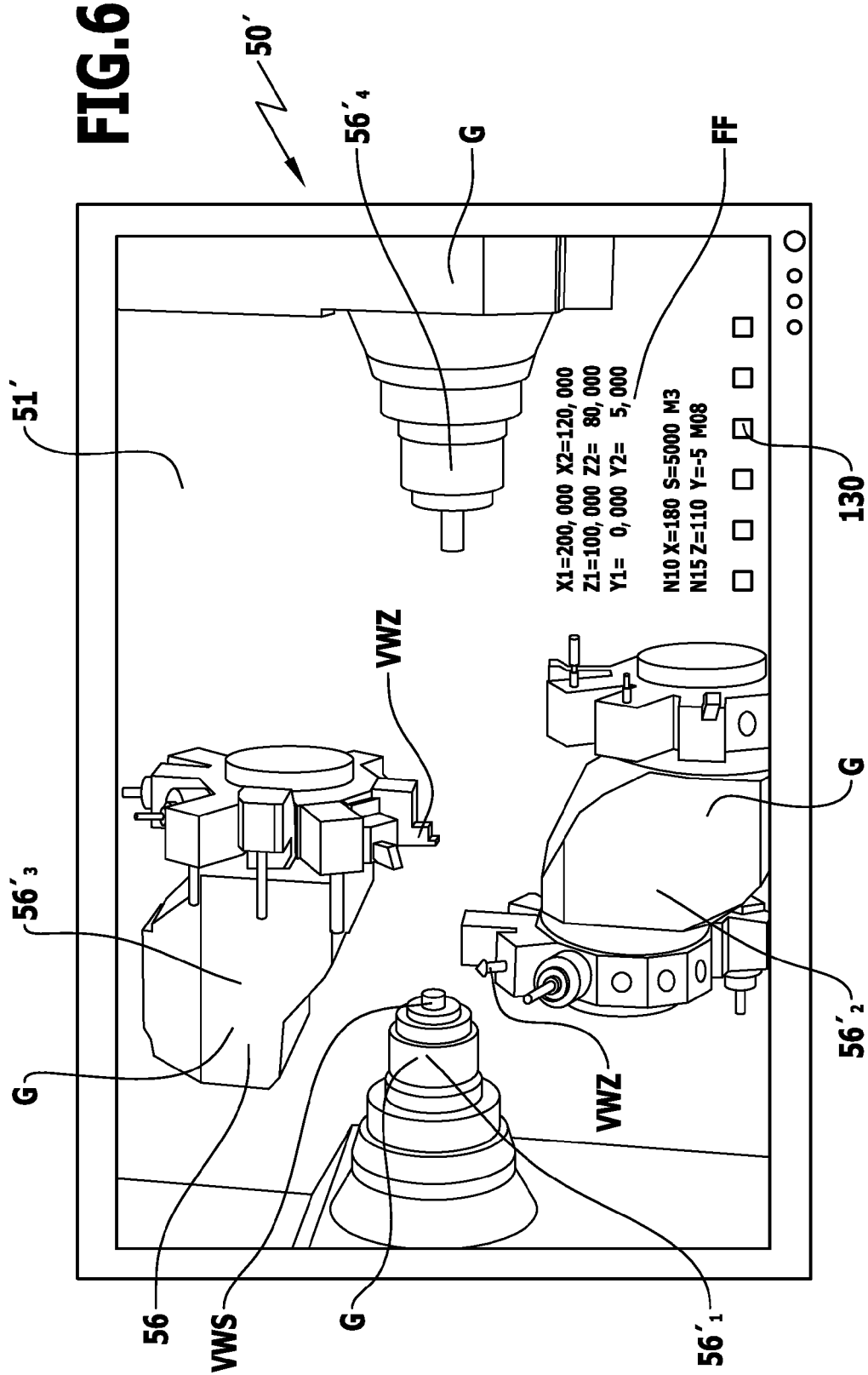
FIG. 6 shows a view, similar to FIG. 5, for a third exemplary embodiment of a control system according to the invention.
Figure 7:
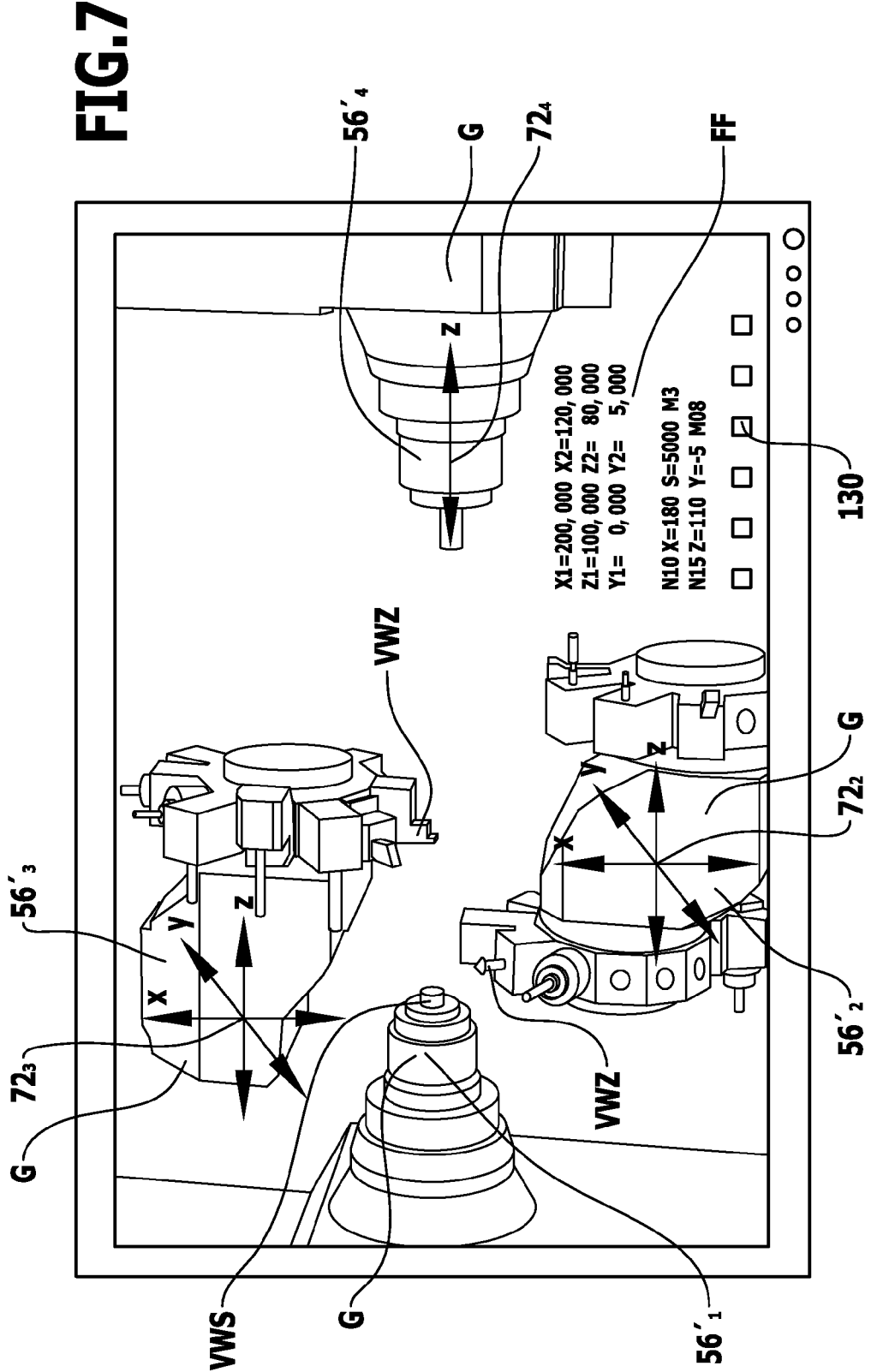
FIG. 7 shows a view, corresponding to FIG. 6, of the third exemplary embodiment, with the possible motions illustrated by graphical symbols.
Figure 8:
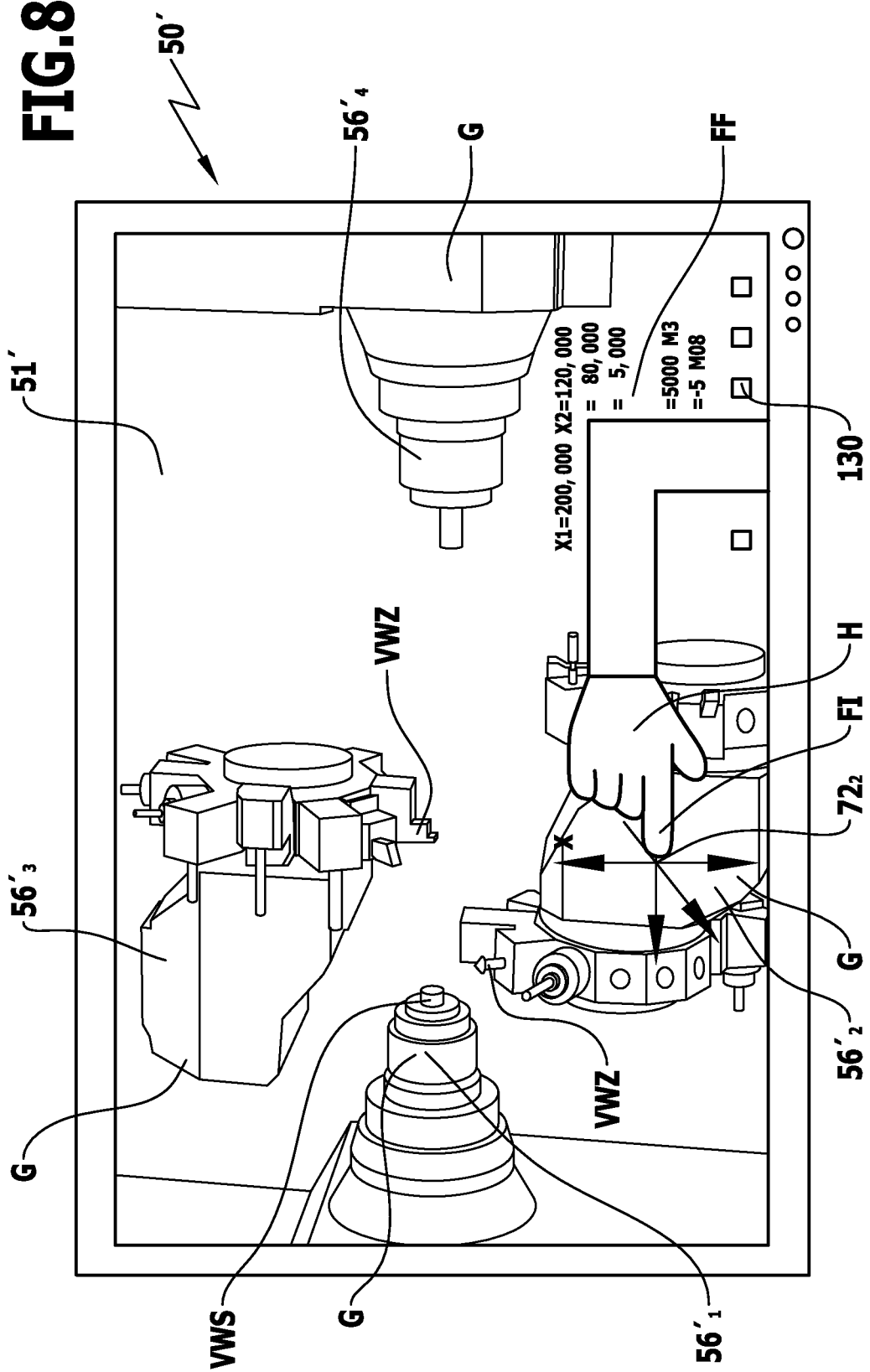
FIG. 8 shows a view, corresponding to FIG. 7, of the third exemplary embodiment, illustrating a manual interaction for moving a virtual machining unit.

In a third exemplary embodiment of a control system 10 according to the invention, illustrated in FIGS. 6 to 8, the elements which are identical to those in the first and second exemplary embodiments of the control system according to the invention are provided with the same reference numerals, so that with regard to the function and the description thereof full reference is made to the first exemplary embodiment.

In contrast to the first exemplary embodiment, the screen 51' of the visualization unit 50' is formed as a touch-controllable screen, also referred to as a touchscreen, which is thus able to represent not only the visualization elements G and FF, but also control buttons 130 which may be necessary, so that further operating functions may be implemented via these control buttons 130.

For displaying the possible functions, as illustrated in FIG. 7 and FIG. 8, graphical symbols 72 are provided as visualization elements, which allow the possible motions in the direction of the axes, for example in the direction of the X, Y, and Z axes, which are provided for each of the machining units 56'$_2$, 56'$_3$ and 56'$_4$, to be visualized.

These graphical symbols 72$_2$, 72$_3$, and 72$_4$ may be activated, for example, by an operator, as illustrated in FIG. 8, by pressing with a hand H, preferably with a finger FI, on the graphical element G of the particular machining unit 56'$_2$, 56'$_3$ and 56'$_4$, and thus touching it. The graphical symbols 72$_2$, 72$_3$, and 72$_4$ which display the possible motions of the machining units 56'$_2$, 56'$_3$ and 56'$_4$ are not shown until this touching is performed.

Instead of using the mouse 84, in the present exemplary embodiment the operator, as illustrated in FIG. 8, has the option to bring about the display of the graphical symbol 72$_2$, which shows the possible motions that exist in the direction of the X, Y, and Z axes, directly on the screen 51', by using his hand H, in particular a finger FI, to touch the graphical element G which represents the machining unit 56$_2$.

This results in an association of the subsequent motion of the reference point, produced on the screen 51' by the finger FI, with the possible motions of the machining unit 56$_2$, and moving the reference point on the screen 51' causes manual location data MP to be generated, as described in conjunction with the first exemplary embodiment.

Manual position data ML and manual control data MST are thus generated, in the same way as described for the first exemplary embodiment, which in turn cause the visualization controller 40 to control the visualization unit 50' in such a way that the machining unit 56'$_2$ is displaced on the screen 51', as explained in detail in conjunction with the first exemplary embodiment.

Figure 9:
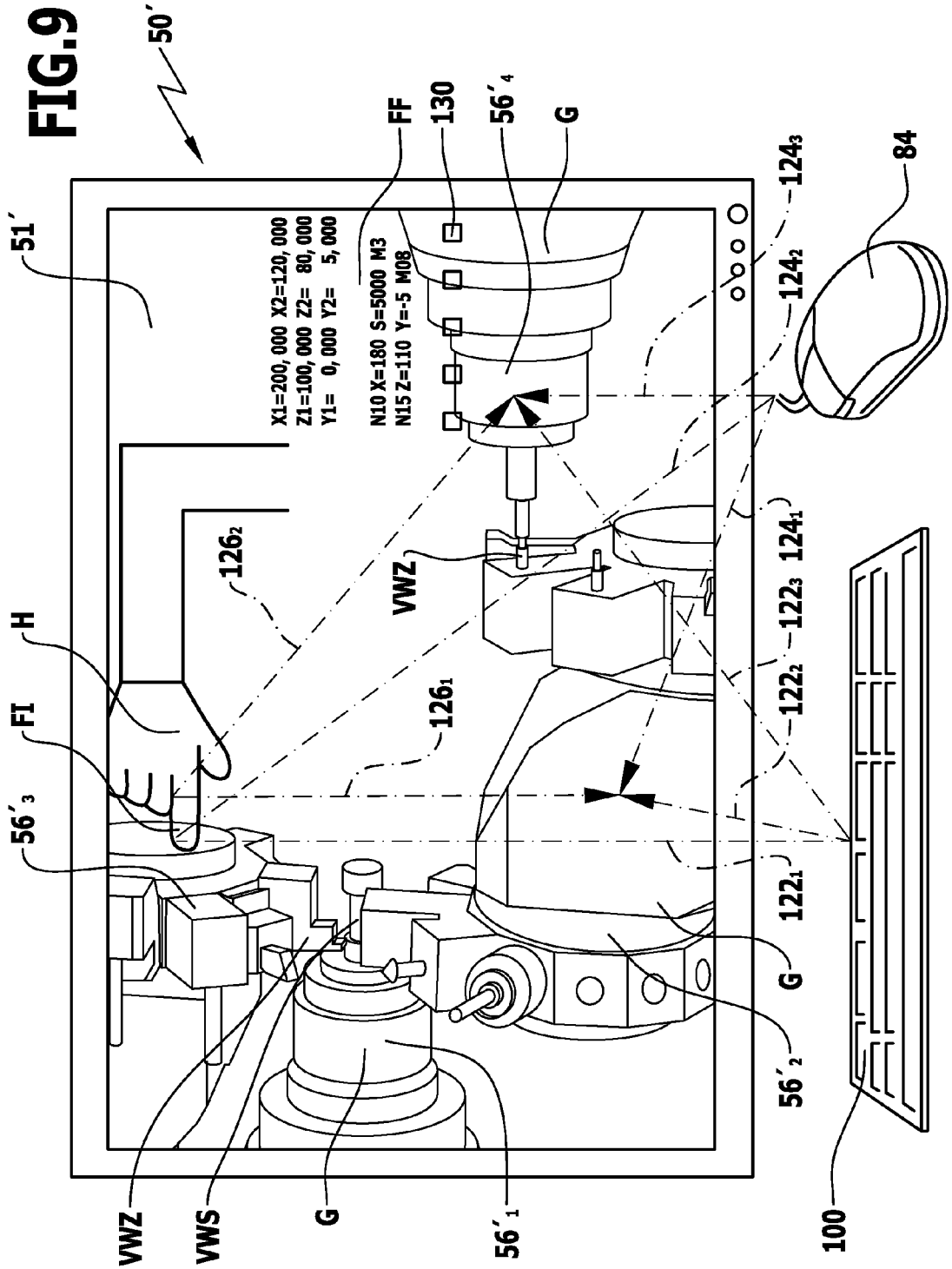
FIG. 9 shows a view, similar to FIG. 5, for a fourth exemplary embodiment of a control system according to the invention.

In a fourth exemplary embodiment of a control system according to the invention, the screen 51' of which is illustrated in FIG. 9, the possible interactions of the above exemplary embodiments are provided in combination with one another.

That is, there is the option of performing manual interactions via the control units, namely, the mouse 84 and the keyboard 100, illustrated in conjunction with the first exemplary embodiment and the second exemplary embodiment. At the same time, however, the screen is formed as an operation-controllable screen 51', so that there is also an option for the operator to interact directly using his hand H, in the manner described for the third exemplary embodiment, by pressing with a finger FI on a location on the screen 51'.

These possible interactions are also illustrated in FIG. 9 by means of lines of influence 122, 124, and 126.

Manual position data ML, tool correction addresses WKA, and manual control data MST may thus be generated and used with all described manual interactions in the manner described, by means of the function data generator unit 92.

The invention claimed is:

1. A method for controlling a machine tool having a work space and machining units arranged therein, the method comprising the steps of:
    representing an actual machine tool according to operating data and a stored machine model, at least in a region of the work space thereof, on a visualization unit, by means of visualization elements, as a virtual machine tool having virtual machining units provided in a virtual work space;
    selecting a function of the machine tool to be performed with a manual interaction determining a performance of the function by a manual movement action;
    using a function data generator to generate operating data which correspond to the associated function as performed by the manual interaction; and
    transmitting these operating data are transmitted to the visualization controller representing the function of the virtual machining units, on the visualization unit, using the visualization elements for representing, the function specified and performed by the manual interaction.

2. Method according to claim 1, wherein when the function is selected, the visualization element representing the function is highlighted on the visualization unit.

3. Method according to claim 1, wherein calling up the particular function results in a representation of the visualization element for this function.

4. Method according to claim 1, wherein the possible functions of the actual machine tool are stored in the machine model, and that the function selection unit limits the functions to be associated to the possible functions of the actual machine tool.

5. Method according to claim 4, wherein the possible functions of the actual machine tool are represented on the visualization unit by means of visualization elements.

6. Method according to claim 1, wherein a graphical element is used as at least one of the visualization elements.

7. Method according to claim 1, wherein a function field is used as at least one of the visualization elements.

8. Method according to claim 1, wherein at least one of the visualization elements represents a virtual machining unit.

9. Method according to claim 1, wherein at least one of the visualization elements represents a tool.

10. Method according to claim 1, wherein at least one of the visualization elements represents a virtual workpiece.

11. Method according to claim 1, wherein a hand-held control unit is used as an interaction unit for determining the manual interaction.

12. Method according to claim 1, wherein a touch-controllable visualization unit is used as an interaction unit for determining the manual interaction.

13. Method according to claim 1, wherein the operating data are combined to form a storable data stream, using a data stream generator.

14. Method according to claim 13, wherein the storable data stream is formed as a data stream in which the operating data follow one another in the time sequence of their processing.

15. Method according to claim 13, wherein the data stream is stored in the record/playback unit as a data file.

16. Method according to claim 1, wherein the record/playback unit is used to reproduce the data stream in such a way that one of the functions is represented using the visualization controller and the visualization unit, and/or the actual machine tool is controlled using this data stream.

17. Method according to claim 1, wherein the function generator unit generates position data and/or control data as operating data.

18. Method according to claim 17, wherein actuator signals are generated using an adjustment control system, based on control data.

19. Method according to claim 18, wherein that on the basis of the actuator signals, the visualization controller is used to generate the representation of the virtual machine tool, using the functions which correspond to the actuator signals.

20. Method according to claim 1, wherein the operating data correspond to position data and/or control data which are generated by conventional machine tool control systems, preferably programmable machine tool control systems.

21. Method according to claim 17, wherein the position data are free of tool correction data.

22. Method according to claim 21, wherein control information is generated by a position controller, based on location information.

23. Method according to claim 22, wherein the visualization controller receives the control information, and, on the basis of same, the representation of the virtual machine tool is generated on the visualization unit, using function sequences which correspond to the control information.

24. Method according to claim 17, wherein in a tool correction module, the position data are corrected using tool correction data, and location information is generated.

25. Method according to claim 24, wherein tool-specific tool correction data which may be called up via tool correction addresses are stored in the tool correction module.

26. Method according to claim 25, wherein tool correction addresses for finding the tool correction data corresponding to the particular tool are transmitted to the tool correction module.

27. Method according to claim 26, wherein the tool correction addresses are generated in the function data generator unit.

28. A method for controlling a machine tool having a work space and machining units arranged therein, the method comprising the steps of:
representing an actual machine tool according to operating data and a stored machine model, at least in a region of the work space thereof, on a visualization unit, by means of visualization elements, as a virtual machine tool having virtual machining units provided in a virtual work space;
selecting a function of the machine tool to be performed with a manual interaction determining a performance of the function by a manual movement action;
using a function data generator to generate operating data which correspond to the associated function as performed by the manual interaction; and
storing these operating data in a recording/playback unit.

29. Method according to claim 28, wherein the manual interaction is represented at the same time by the visualization elements.

30. A method for controlling a machine tool having a work space and machining units arranged therein, the method comprising the steps of:
representing an actual machine tool according to operating data and a stored machine model, at least in a region of the work space thereof, on a visualization unit, by means of visualization elements, as a virtual machine tool having virtual machining units provided in a virtual work space;
associating a function of the machine tool with a manual interaction to be performed:
determining performance of the function by a manual movement action on an interaction unit, and at the same time by an interaction visualization element provided on the visualization unit and controllable by the interaction unit;
using a function data generator unit to generate operating data which correspond to the associated function as performed by the manual interaction, transmitting these operating data to the visualization controller representing the functions of the virtual machining units as virtual functions on the visualization unit; and
using the visualization elements for representing the function specified by the manual interaction.

31. Method according to claim 30, wherein the function is specified as motion, using the interaction unit, and is visualized on the virtual machine tool as motion of at least one of the visualization elements, by means of the visualization controller.

32. Method according to claim 30, wherein the function to be associated with the manual interaction in each case is selectable using the interaction unit.

33. Method according to claim 32, wherein the function is selected by calling up at least one of the visualization elements.

34. Method according to claim 32, wherein at least one of the visualization elements is called up by approaching and touching at least one of the visualization elements, using the interaction unit.

35. Method according to claim 30, wherein a location data generator is used to determine location data of the interaction unit, and, based on these position data, the position data are generated.

36. Method according to claim 35, wherein the location data generator subtracts tool correction data from the location data obtained from the interaction unit.

37. Method according to claim 30, wherein a tool correction data generator of the function data generator unit is used to detect tool correction data from the interaction unit.

38. Method according to claim 37, wherein tool correction data are detected and stored using the tool correction generator.

39. Method according to claim 38, wherein tool correction addresses are generated using the tool correction generator.

40. Method according to claim 30, wherein the function data generator unit has a control data generator which detects control instructions from the interaction unit.

41. Method according to claim 40, wherein the control data are generated, based on the control instructions, using the control data generator.

42. A method for controlling a machine tool having a work space and machining units arranged therein, the method comprising the steps of:
representing an actual machine tool according to operating data and a stored machine model, at least in a region of the work space thereof, on a visualization unit, by means of visualization elements, as a virtual machine tool having virtual machining units provided in a virtual work space;

using an interaction unit for specifying a function of the machine tool by touching a function field on the visualization unit;

determining performance of the function by a manual movement in touch with the visualization unit;

using a function data generator using a function data generator unit to generate operating data which correspond to the associated function as performed by the manual interaction, transmitting these operating data to the visualization controller representing the functions of the virtual machining units as virtual functions on the visualization unit; and using the visualization elements for representing the function specified by the manual interaction.

* * * * *

UNITED STATES PATENT AND TRADEMARK OFFICE
CERTIFICATE OF CORRECTION

| | | |
|---|---|---|
| PATENT NO. | : 8,606,391 B2 | Page 1 of 1 |
| APPLICATION NO. | : 13/302430 | |
| DATED | : December 10, 2013 | |
| INVENTOR(S) | : Eberhard Beck et al. | |

It is certified that error appears in the above-identified patent and that said Letters Patent is hereby corrected as shown below:

In the Claims:

In column 16, line 33, delete ","

Signed and Sealed this
Sixth Day of May, 2014

Michelle K. Lee
*Deputy Director of the United States Patent and Trademark Office*